United States Patent
Song et al.

(10) Patent No.: US 8,897,772 B2
(45) Date of Patent: Nov. 25, 2014

(54) TERMINAL AND METHOD FOR CONTROLLING CELL SEARCHING THEREOF

(75) Inventors: Pyeong Jung Song, Daejeon (KR); Hyun Seo Park, Daejeon (KR); Yeon Seung Shin, Daejeon (KR); Gyung-chul Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 768 days.

(21) Appl. No.: 12/823,439

(22) Filed: Jun. 25, 2010

(65) Prior Publication Data

US 2010/0330989 A1 Dec. 30, 2010

(30) Foreign Application Priority Data

Jun. 26, 2009 (KR) .................. 10-2009-0057706
Jun. 25, 2010 (KR) .................. 10-2010-0060441

(51) Int. Cl.
*H04W 4/00* (2009.01)
*H04W 48/16* (2009.01)

(52) U.S. Cl.
CPC .................................. *H04W 48/16* (2013.01)
USPC ........ 455/434; 455/422.1; 455/515; 455/524; 370/328; 370/338

(58) Field of Classification Search
USPC .............. 455/434, 422.1, 443, 466, 449, 515, 455/524–525; 370/310, 328, 338
See application file for complete search history.

(56) References Cited

U.S. PATENT DOCUMENTS

| | | | |
|---|---|---|---|
| 5,541,929 A * | 7/1996 | Jokura | 370/337 |
| 7,145,890 B1 | 12/2006 | Seo et al. | |
| 7,426,550 B2 * | 9/2008 | Abhishek et al. | 709/220 |
| 2002/0049058 A1 * | 4/2002 | Tee | 455/437 |
| 2002/0102976 A1 * | 8/2002 | Newbury et al. | 455/436 |
| 2004/0047324 A1 * | 3/2004 | Diener | 370/338 |
| 2008/0026752 A1 * | 1/2008 | Flore et al. | 455/435.2 |
| 2008/0153533 A1 | 6/2008 | Claussen et al. | |
| 2008/0227447 A1 | 9/2008 | Jeong et al. | |
| 2009/0098873 A1 * | 4/2009 | Gogic | 455/436 |
| 2011/0263267 A1 | 10/2011 | Klatt et al. | |
| 2012/0028639 A1 | 2/2012 | Jeong et al. | |
| 2012/0295616 A1 | 11/2012 | Jeong et al. | |
| 2014/0038610 A1 | 2/2014 | Jeong et al. | |

FOREIGN PATENT DOCUMENTS

| | | |
|---|---|---|
| KR | 2001-0017137 | 3/2001 |
| KR | 10-2008-0067512 | 7/2008 |
| WO | 2009/039904 A1 | 4/2009 |

OTHER PUBLICATIONS

Pilot Signal, Wikipedia, see p. 1.*

* cited by examiner

*Primary Examiner* — Vladimir Magloire
(74) *Attorney, Agent, or Firm* — Nelson Mullins Riley & Scarborough LLP (57) ABSTRACT

A cell search method for a terminal capable of cell search control includes: receiving a message including first cell search information from a macro cell base station that manages a macro cell; updating second cell search information stored in the terminal based on the first cell search information; and searching for an accessible cell based on the updated second cell search information.

17 Claims, 10 Drawing Sheets

```
--ASN1START
Paging ::=                      SEQUENCE {
        PagingRecordList        PagingRecordList        OPTIONAL, --Need ON
        systemInfoModification  ENUMERATED {true}       OPTIONAL, --Need ON
        etws-Indication         ENUMERATED {true}       OPTIONAL, --Need ON
        tac-Indication          TACRecordList           OPTIONAL, --Need ON
        nonCriticalExtension    SEQUENCE {}             OPTIONAL, --Need OP
}

PagingRecordList ::=            SEQUENCE (SIZE (1..maxPageRec)) OF PagingRecord
PagingRecord ::=                SEQUENCE {
        ue-Identity             PagingUE-Identity,
        cn-Domain               ENUMERATED {ps, cs},
        ...
}

PagingUE-Identity ::=           CHOICE {
        s-TMSI                  S-TMSI,
        imsi,                   IMSI,
        ...
}

IMSI ::=                        SEQUENCE (SIZE (6..21)) OF IMSI-Digit
IMSI-Digit ::=                  INTEGER (0..9)
PagingRecordList ::=            SEQUENCE (SIZE (1..maxPageRec)) OF PagingRecord
PagingRecord ::=                SEQUENCE {
        ue-Identity             PagingUE-Identity,
        cn-Domain               ENUMERATED {ps, cs},
        ...
}

TACRecordList ::=               SEQUENCE (SIZE (1..maxPageRec)) OF TACRecord
TACRecord ::=                   SEQUENCE {
        CSG-Identity            CSG-Identity,
}
--ASN1START
```

FIG. 6

```
-- ASN1START
SystemInformationBlockType9 ::=    SEQUENCE {
    hnb-Name                           OCTET STRING (SIZE(1..48))    OPTIONAL,  -- Need OR
    hnb-Identity                       HnbRecordList                 OPTIONAL,  -- Need ON
}

HnbRecordList ::= SEQUENCE (SIZE (1..maxHnbRec)) OF HnbRecord

HnbRecord ::= SEQUENCE {
    hnb-Identity,
    cgi-Identity                       CGI-Identity,
    Power-Status                       Power-Status,
    freq-Identity                      freq-Identity,
    Power-Status                       Power-Status,
    physical cell-Identity             physical cell-Identity,
    csg-identity                       CSG-Identity,
    ...
}
-- ASN1START
```

FIG. 7

| HeNB Id | My CSG Id | | Lstest UE-moving Stochastic | | | Latest WHO | | Latest&Updated HeNB Status | | | |
|---|---|---|---|---|---|---|---|---|---|---|---|
| | Global Cell (CGI) | Cell Type | Duration UE stayed in Cell | Timing info UE stayed in Cell | Visiting frequency | Macro eNB Id cell belongs to | TAC Id cell belongs to | Power status | Carrier fre (Fc) | Physical cell Id (PCI) | Accessibility |
| HeNB #1 | ECGI #1 | Home | (max 4095sec) | (dmm) | (m times) | eNB #1 | TAC #1 | ON | FC #1 | PCI #1 | OK |
| HeNB #2 | ECGI #2 | Office | (max 4095sec) | (dmm) | (m times) | eNB #1 | TAC #1 | ON | FC #2 | PCI #1 | OK |
| HeNB #3 | ECGI #3 | Neigh | (max 4095sec) | (dmm) | (m times) | eNB #1 | TAC #1 | ON | FC #3 | PCI #1 | OK |
| - - - | | | | | | | | | | | |
| HeNB #n | ECGI #n | (open) | (max 4095sec) | (dmm) | (m times) | eNB #n | TAC #m | OFF Broken | FC #n | PCI #n | NOK |

FIG. 8

| my eNB Id | CSG Id belong to the eNB | HeNB Id belong to the SCG Id | HeNB Id (or CSG – cell Id) ||||| 
|---|---|---|---|---|---|---|---|
| | | | Cell Global Id (CGI) | PWR Status | Carrier Freq (Fc) | PCI (Phy Cell Id) |
| eBId#n | CSG ID#1 (mapped to UE Id) | HeNB#11 | CGI#11 | On | Fc#11 | PCI#11 |
| | | HeNB#12 | CGI#12 | On | Fc#12 | PCI#12 |
| | | HeNB#13 | CGI#13 | On | Fc#13 | PCI#13 |
| | CSG ID#2 (mapped to UE Id) | HeNB#21 | CGI#21 | On | Fc#21 | PCI#21 |
| | | HeNB#22 | CGI#22 | Off – Broken | Fc#22 | PCI#22 |
| | | HeNB#2x | CGI#2x | On | Fc#2x | PCI#2x |
| | - - - | | | | | |
| | CSG ID#m (mapped to UE Id) | HeNB#m1 | CGI#m1 | On | Fc#m1 | PCI#m1 |
| | | HeNB#m2 | CGI#m2 | Off | Fc#m2 | PCI#m2 |
| | | HeNB#my | CGI#my | On | Fc#my | PCI#my |

FIG. 9

| TAC# | Set of CSG Id belong to TAC | Set of HeNB id belong to each CSG Id(optional) |
|---|---|---|
| TAC#1 | CSG#11, CSG #12. - - - CSG#1a | Set of HeNB id belong to CSG #11<br>- - -<br>Set of HeNB id belong to CSG #1a |
| TAC#2 | CSG#21, CSG #32. - - - CSG#2b | |
| - - - | | |
| TAC#n | CSG#n1, CSG #n2. - - - CSG#nz | |

FIG. 10

TERMINAL AND METHOD FOR CONTROLLING CELL SEARCHING THEREOF

CROSS-REFERENCE TO RELATED APPLICATION

This application claims priority to and the benefit of Korean Patent Application Nos. 10-2009-0057706 and 10-2010-0060441 filed in the Korean Intellectual Property Office on Jun. 26, 2009 and Jun. 25, 2010, the entire contents of which are incorporated herein by reference.

BACKGROUND OF THE INVENTION (a) Field of the Invention

The present invention relates to a terminal and a method for controlling cell searching thereof.

(b) Description of the Related Art

A home cell is a small base station used in homes, offices, campuses, and hot spots, which is also referred to as a femtocell. The home cell uses a frequency that is the same as or different from other cells e.g., a macro cell, targeting a wider region than the home cell.

When the home cell and the macro cell use different frequencies from each other, the number of neighboring cells for which a terminal searches in order to support mobility from the macro cell to the home cell is quite large. This cell searching increases the computational complexity and processing load of the terminal and has a significant effect on the power consumption of the terminal.

Moreover, the home cell is problematic in that the equipment may be powered on, powered off, and put into a fault condition owing to its characteristics, a carrier frequency in use may be changed on the basis of the frequency management policy of the service provider and the cognitive ratio technology, or physical channel numbers (physical cell IDs, PCIs) used for cell search may be changed. Thus, home cell search information to be stored in the terminal needs to be always kept up to date.

Cell searching is typically carried out by autonomous cell searching. However, since searching for all cells included in a neighboring cell list is periodically performed when using the autonomous cell searching, it is not possible to efficiently search cells.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to efficiently perform cell searching by controlling the cell searching of a terminal depending on a communication environment.

An exemplary embodiment of the present invention provides a method for a terminal to control cell searching, the method including: receiving a message including first cell search information from a macro cell base station that manages a macro cell; updating second cell search information stored in the terminal based on the first cell search information; and searching for an accessible cell based on the updated second cell search information.

The cell may include a home cell smaller in size than the macro cell.

The receiving of the message may include receiving a paging message.

The receiving of the paging message may include: detecting and receiving a physical downlink control channel (PDCCH) signal while the terminal maintains an idle state; determining whether the physical downlink control channel signal corresponds to the terminal by using the home cell ID of the terminal; and if the physical downlink control channel corresponds to the terminal, demodulating a physical downlink shared channel (PDSCH).

The receiving of the message may include receiving a system information message.

The receiving of the message may include receiving a layer 3 message.

The updating may include determining a cell search cycle.

The determination of the cell search cycle may be made based on at least one of a duration when the terminal resided in the cell, information on a residence time when the terminal resided in the cell, and a number of times when the terminal visits the cell.

The updating may include updating the cell ID.

The updating of the cell ID may include: if a first cell ID included in a first cell search list is included in a second cell search list, activating the first cell ID, and if a second cell ID included in the first cell search list is not included in the second search list, deactivating the second cell ID.

The updating may include updating a cell status.

The updating of a cell status may include, if the cell status is a failed state, informing the user of the failed state.

The updating may include, if the carrier frequency of the cell has been changed, updating information on the changed frequency.

The method may include accessing the searched cell.

Another exemplary embodiment of the present invention provides a terminal including: a receiving unit for receiving a message comprising first cell search information from a macro cell base station that manages a macro cell; a processing unit for updating second cell search information that the terminal stores based on the first cell search information; and a searching unit for searching for an accessible cell based on the updated second cell search information.

The message may include at least one of a paging message, a system information message, and a layer 3 message.

The paging message may comprise a physical downlink control channel (PDCCH) signal.

The processing unit may update a cell ID.

The processing unit may update a cell status.

The processing unit may determine a cell search cycle.

The cell search cycle may be determined based on at least one of a duration when the terminal resided in the cell, information on a residence time when the terminal resided in the cell, and a number of times when the terminal visits the cell.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, an evolved node B (eNodeB), a base transceiver station (BTS), a mobile multihop relay (MMR)-BS, etc., and may include the entire or partial functions of the access point, the radio access station, the node B, the eNodeB, the base transceiver station, the MMR-BS, etc.

Now, a management apparatus of a base station, a management method thereof, a terminal, and a management method of the terminal according to one exemplary embodiment of the present invention will be described with reference to the drawings.

Figure 1:
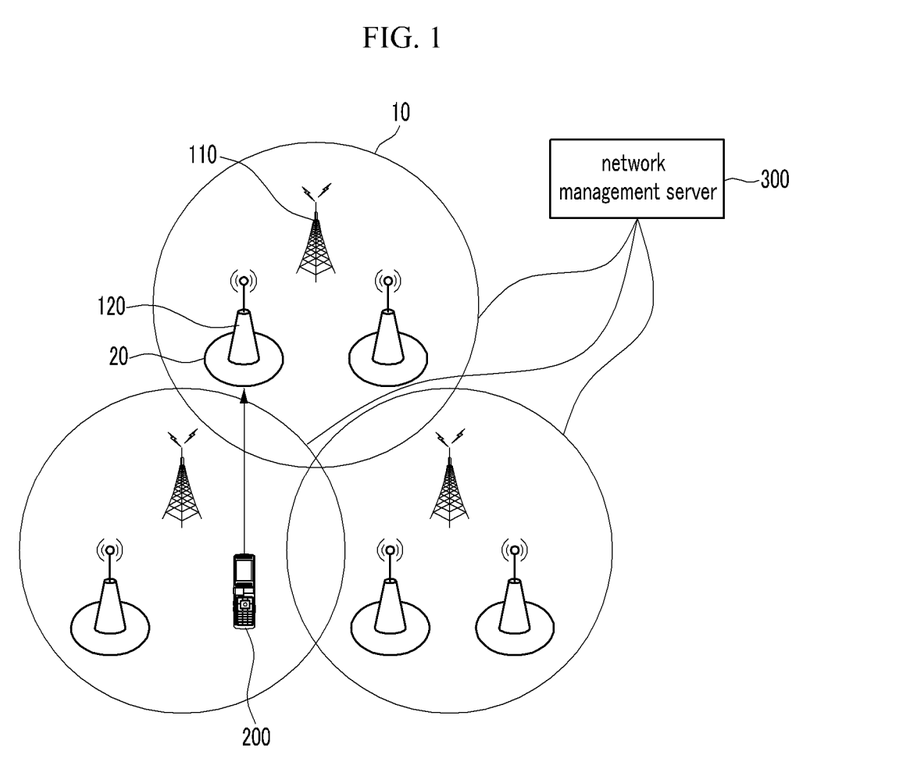
FIG. 1 is a view schematically showing a mobile communication system according to an exemplary embodiment of the present invention.

FIG. 1 is a view schematically showing a mobile communication system according to an exemplary embodiment of the present invention.

Referring to FIG. 1, the mobile communication system includes a macro cell base station 110, a home cell base station 120, a terminal 200, and a network management server 300.

The home cell base station 120 is a miniaturized base station that provides a wireless communication service, and manages a home cell 20. The home cell base station 120 is installed in a shadow area in which radio waves of other cells are deteriorated, such as a home or the inside of a building, to secure the quality of a mobile communication service. The home cell base station 120 can use a frequency in a different band from the macro cell base station 110.

The home cell base station 120 can also be referred to as a home evolved node B (HeNB) or a closed subscriber group cell (CSG-cell).

The macro cell base station 110 manages the macro cell 10. The macro cell 10 includes the home cell 20. The macro cell 10 is a cell in a region that is larger than the home cell 20, and is not limited to a dictionary definition of macro. The macro cell base station 110 maintains and updates information on the home cell 20 included in the macro cell 10, e.g., an auto home cell tracking DB, and transmits this information to the terminal 200.

The macro cell base station 100 and the home cell base station 120 can be connected to each other through a network. The macro cell base station 110 can manage the home cell base station 120 that is connected thereto.

The terminal 200, as an endpoint of a wireless channel, manages status information (a white list) associated with the macro cell base station 110 and the home cell base station 120 accessible by the terminal 200, and searches for neighboring cells 10 and 20 based on this information and accesses them to transmit and receive data.

The network management server 300 manages various profile information and status information on the macro cell 10 and the home cell 20.

Now, a cell search method for a terminal will be described in detail with reference to FIG. 2.

Figure 2:
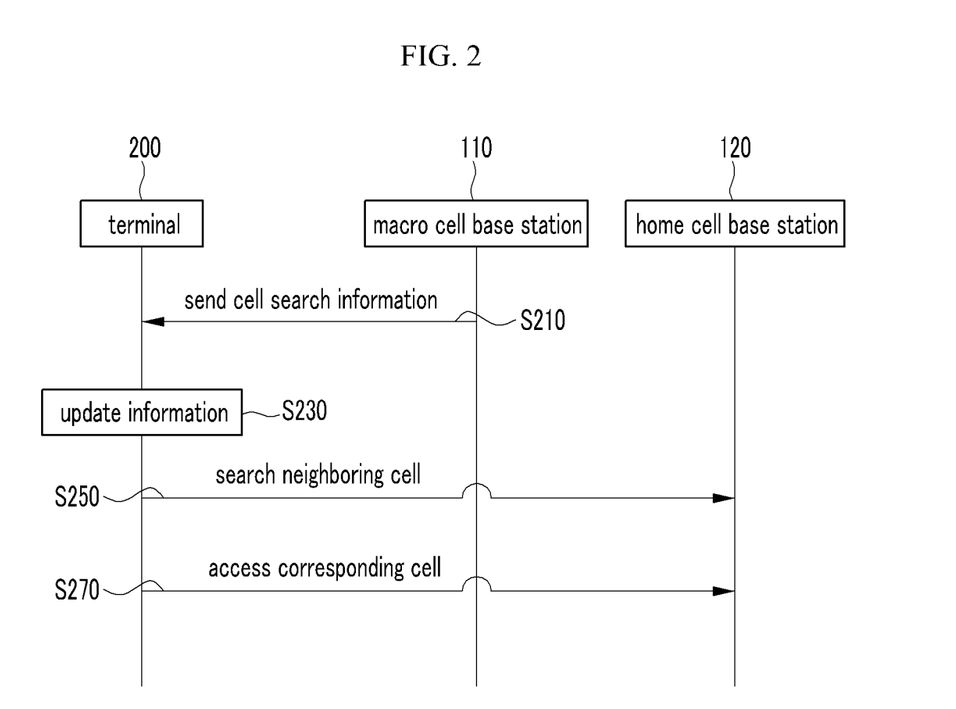
FIG. 2 is an exemplary flowchart illustrating a cell search method for a terminal according to an exemplary embodiment of the present invention.

FIG. 2 is an exemplary flowchart illustrating a cell search method for a terminal according to an exemplary embodiment of the present invention.

Referring to FIG. 2, the macro cell base station 110 sends cell search information to the terminal 200 (S210).

Then, the terminal 200 compares the cell search information with information with previously stored information, i.e., a cell search list to update the information (S230). The information updated in step S230 may involve, for example, cell ID update, cell status update, cell search cycle determination, etc.

The terminal 200 searches for an accessible neighboring cell in the home cell base station 120 or the macro cell base station 110 based on the updated information (S250). After that, the terminal 200 accesses the corresponding base stations 110 and 120 (S270).

Now, the cell search method for the terminal will be described in more detail with reference to FIG. 3.

Figure 3:
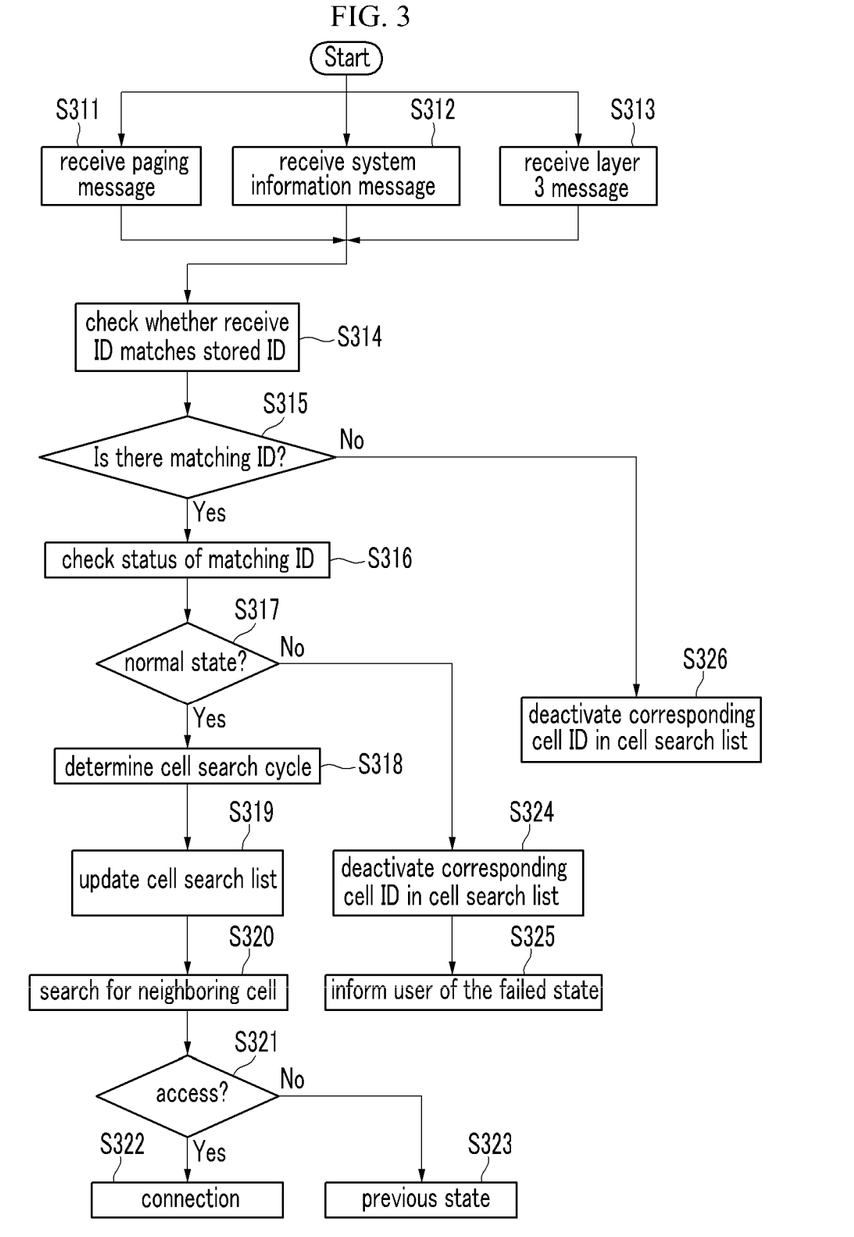
FIG. 3 is another exemplary flowchart illustrating the cell search method for the terminal according to an embodiment of the present invention.

FIG. 3 is another exemplary flowchart illustrating the cell search method for the terminal according to an embodiment of the present invention.

The terminal 200 receives cell search information from the macro cell base station 110 as explained in FIG. 2. The cell search information can be received by paging message reception S311, system information message reception S312, and layer 3 message reception S313.

Now, the method will be described starting from step S311. The terminal 200 can acquire information required for neighboring cell search from a received paging message, and step S311 is carried out when the terminal is in an idle state. Now, step S311 will be described in detail with reference to FIG. 4.

Figure 4:
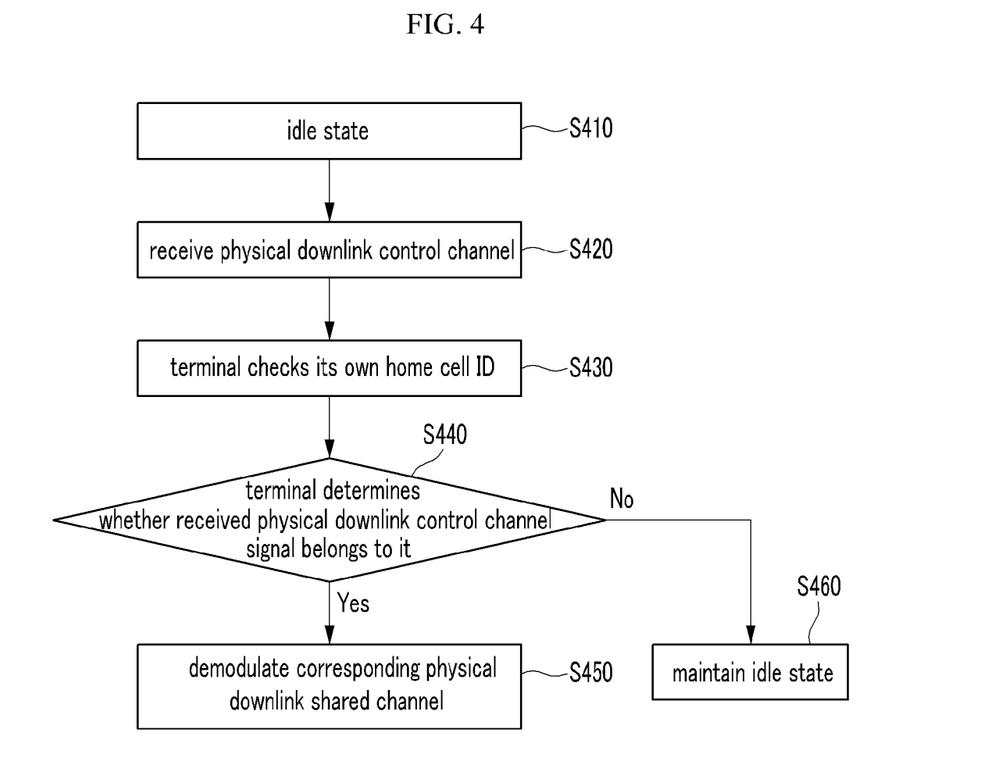
FIG. 4 is a flowchart illustrating a process in which a terminal in an idle state receives a signal according to an exemplary embodiment of the present invention.

FIG. 4 is a flowchart illustrating a process in which a terminal in an idle state receives a signal according to an exemplary embodiment of the present invention.

Referring to FIG. 4, the terminal 200 maintains an idle state (S410), and then detects and receives a physical downlink control channel (PDCCH) signal during a paging cycle (S420).

After that, the terminal 200 checks its home cell ID (home radio network temporary ID (H-RNTI) (S430), and descrambles the physical downlink control channel signal.

The terminal 200 determines whether the received physical downlink control channel signal corresponds, that is, belongs to it (S440), and, if the received physical downlink control channel signal belongs to it as a result of determination, demodulates a physical downlink shared channel (PDSCH), which is paging information, by using the corresponding physical downlink control channel signal format. Thereafter, it is checked whether information obtained by demodulating the PDSCH includes an ID of a home cell in which the terminal is registered, e.g., a CSG ID or a HeNB ID. Here, the demodulated information includes a set of CSG IDs and a set of HeNB IDs that include the corresponding paging area code (PAC).

Figure 5:
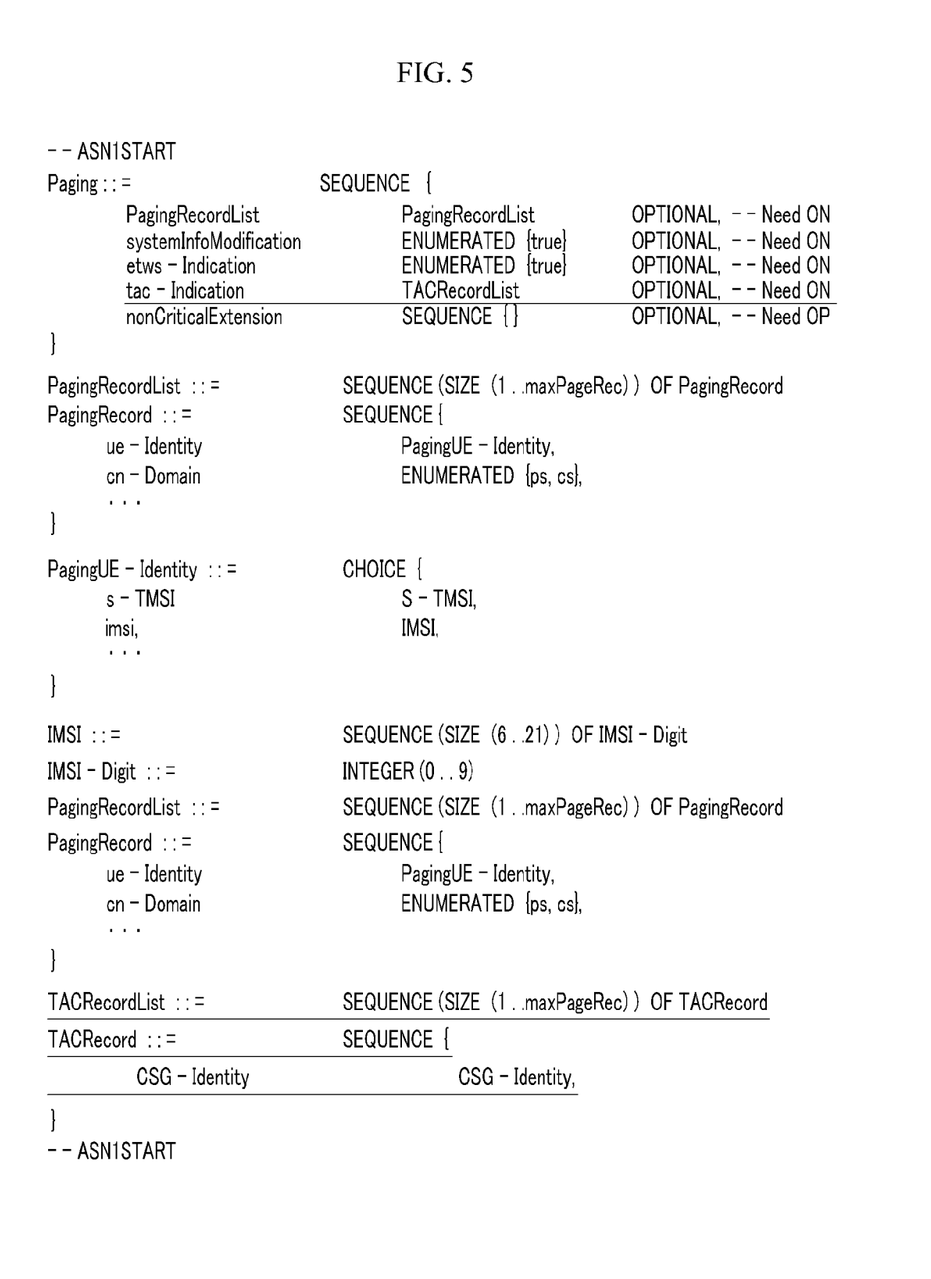
FIG. 5 shows a paging message according to an exemplary embodiment of the present invention.

The paging message received by the terminal 200 in step S311 may be as shown in FIG. 5.

Figure 6:
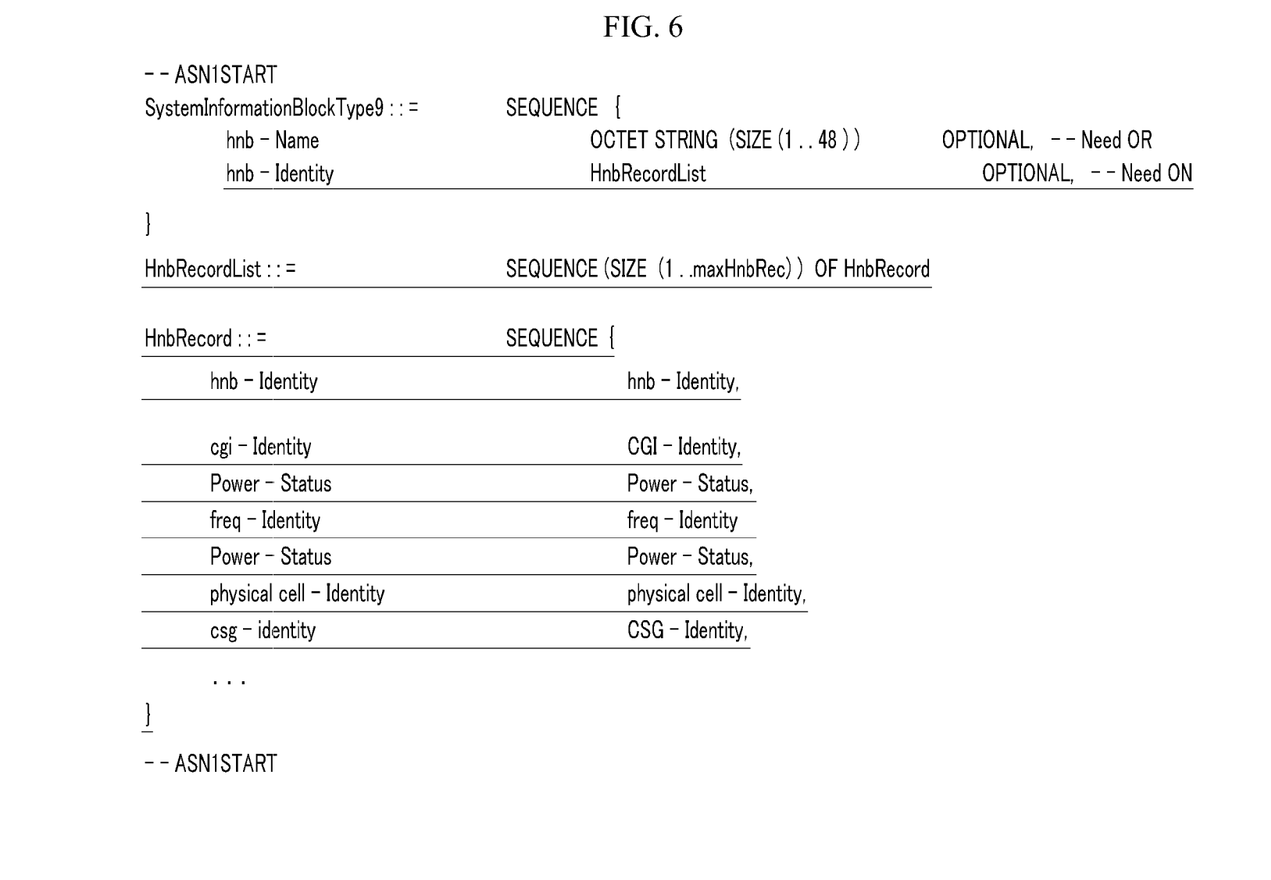
FIG. 6 shows a system information message according to an exemplary embodiment of the present invention.

Referring again to FIG. 3, the terminal 200 can receive a system information message, e.g., system information block type 9 (SIB #9) in the idle state (S312). Upon receipt of the system information message, the terminal 200 checks ID information and various status information of the home cell 20 included in the corresponding macro cell 10, and compares them with its stored home cell ID. SIB#9 may be as shown in FIG. 6.

The terminal 200 can receive a specific layer 3 message, e.g., a radio resource control connection reconfiguration message from the macro cell base station 110 during a call setup (S313). The layer 3 message received by the terminal 200 includes the ID and status information of the home cell 20 included in the macro cell 10. Moreover, the terminal 200 can receive a handover command message during handover.

Then, the terminal 200 checks whether a received ID included in the received message, i.e., an ID associated with the home cell, matches its stored home cell ID (S314). The terminal 200 determines whether a matching ID exists as a result of checking (S315).

If a matching ID exists as a result of checking, the terminal 200 checks the status of the matching ID (S316). Also, the terminal 200 updates various status parameters to the latest values depending on the cell status of the received cell ID. Thereafter, the terminal 200 determines whether the cell is in a normal state or not (S317). As a result of determination, if the cell is in a normal state, the terminal 200 determines a cell search cycle (S318). Now, a method for determining a cell search cycle will be described in detail.

The cell search cycle is determined depending on the power state of the home cell base station 120. When the power of the home cell base station 120 is in normal operation, the corresponding home cell 20 becomes a search target, and when the power of the home cell base station 120 is in an abnormal state, i.e., a powered-off state or a failed state, the search cycle of the corresponding home cell 20 is set to infinite, so that the home cell base station 120 is excluded from the search target.

The operating frequency of the home cell 20 may vary according to a radio wave environment, the frequency management policy of the service provider, or the cognitive ratio technology. If the carrier frequency of the home cell 20 varies in real time, the network management server 300 or the macro cell base station 110 informs the terminal 200 of the latest information so as to easily carry out inter-frequency cell searching.

When the number of home cells 20 is very large and the number of physical cell IDs (PCIs) required for cell search is limited to, for example, 504, a PCI confusion may occur between the physical channel IDs. Accordingly, in the event of PCI confusion between the physical channel IDs, the network management server 300, etc can detect it in advance and transmit, to the terminal 200, physical channel IDs between which no confusion has occurred.

The terminal 200 can determine a cell search cycle by statistical numerical parameters, which will be described in detail.

The terminal 200 may vary the cell search cycle according to statistical values of the duration of residence in a particular cell including the home cell 20, the residence time, and the number of visits. The residence time information involves applying statistical values for a predetermined cycle of time, and is displayed in hour and minute. In one example, if the terminal 200 performs communication in its registered home cell 20 at a friend's home for more than 50% of a week's time and the user returns home with the terminal 200, the cell search cycle for its own home cell can be set to be short and the cell search cycle for a cell that is registered but has not been visited for a week can be set to be long. At this time, even though the residence time of the terminal 200 is very long, if there is no communication activity, this situation can be taken into account when determining a cell search cycle.

Referring again to FIG. 3, after determining a cell search cycle, the terminal 200 updates its stored neighboring cell search list (S319). In detail, if a received cell ID is included in the cell search list stored by the terminal 200, the terminal 200 is set to activation. Moreover, if a receive cell ID is not included in the cell search list stored by the terminal 200, the terminal 200 can set the corresponding cell ID to deactivation and exclude the corresponding cell ID from the cell search range.

Thereafter, the terminal 200 searches for neighboring cells according to the updated cell search list (S320).

The terminal 200 determines whether a target cell has been found as a result of cell search (S321). If the target cell has been found, the terminal 200 accesses the target cell (S322). If the target cell has not been found, the terminal 200 maintains the previous state (S323).

Meanwhile, as a result of determination on whether the cell is in a normal state in step S317, if the cell is not in a normal state, the terminal 200 deactivates the corresponding cell ID in the cell search list (S324). Thereafter, the terminal 200 informs the user that the corresponding cell ID is in a failed state (S325).

Meanwhile, if it is determined that there exists no matching ID as a result of checking in step S315, the corresponding cell ID is deactivated in the cell search list (S326).

Now, information stored by the terminal 200 will be described with reference to FIG. 7.

Figure 7:
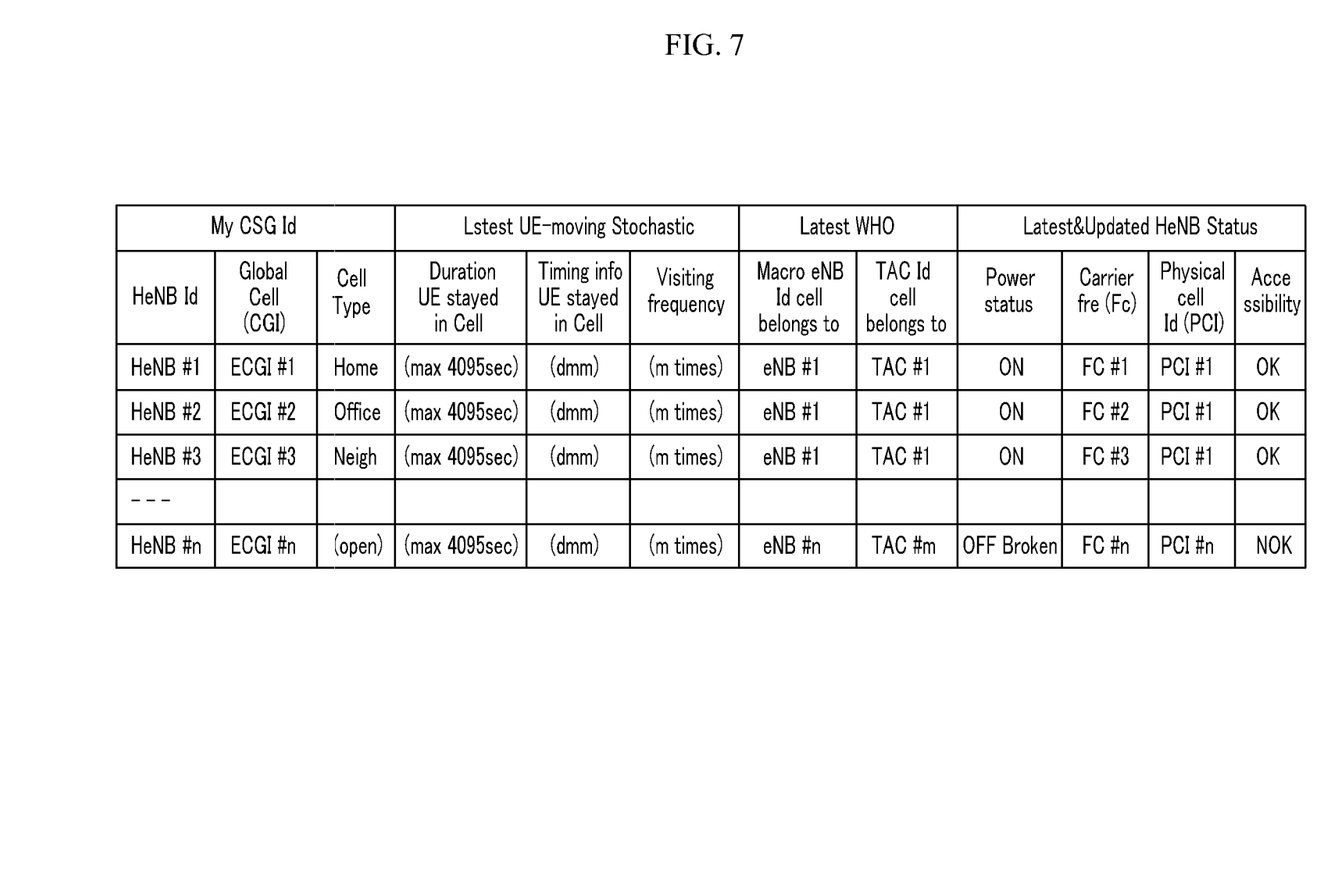
FIG. 7 is a view illustrating one example of information associated with a home cell stored by a terminal according to an exemplary embodiment of the present invention.

FIG. 7 is a view illustrating one example of information associated with a home cell stored by a terminal according to an exemplary embodiment of the present invention.

Referring to FIG. 7, the information stored by the terminal 200 includes first information (MY CSG ID), which is cell ID information registered by the terminal 200, second information (latest UE-moving stochastic), which is the latest stochastic mobility information of the terminal, third information (latest WHO), which is the latest WHO information, and fourth information (latest & updated HeNB status), which is the latest and updated home cell base station status information.

The first information includes a global cell ID (GCI) and a cell type, the second information includes the duration in which the terminal resided in the cell, the time during which the terminal resided in the cell, and the number of visits, and the third information includes information on which the macro base station cell ID belongs to and information on which the tracking area code ID cell belongs to, and the fourth information includes power status, carrier frequency, physical cell ID, and accessibility.

Now, the ID and status information of the home cell will be described in detail with reference to FIG. 8.

Figure 8:
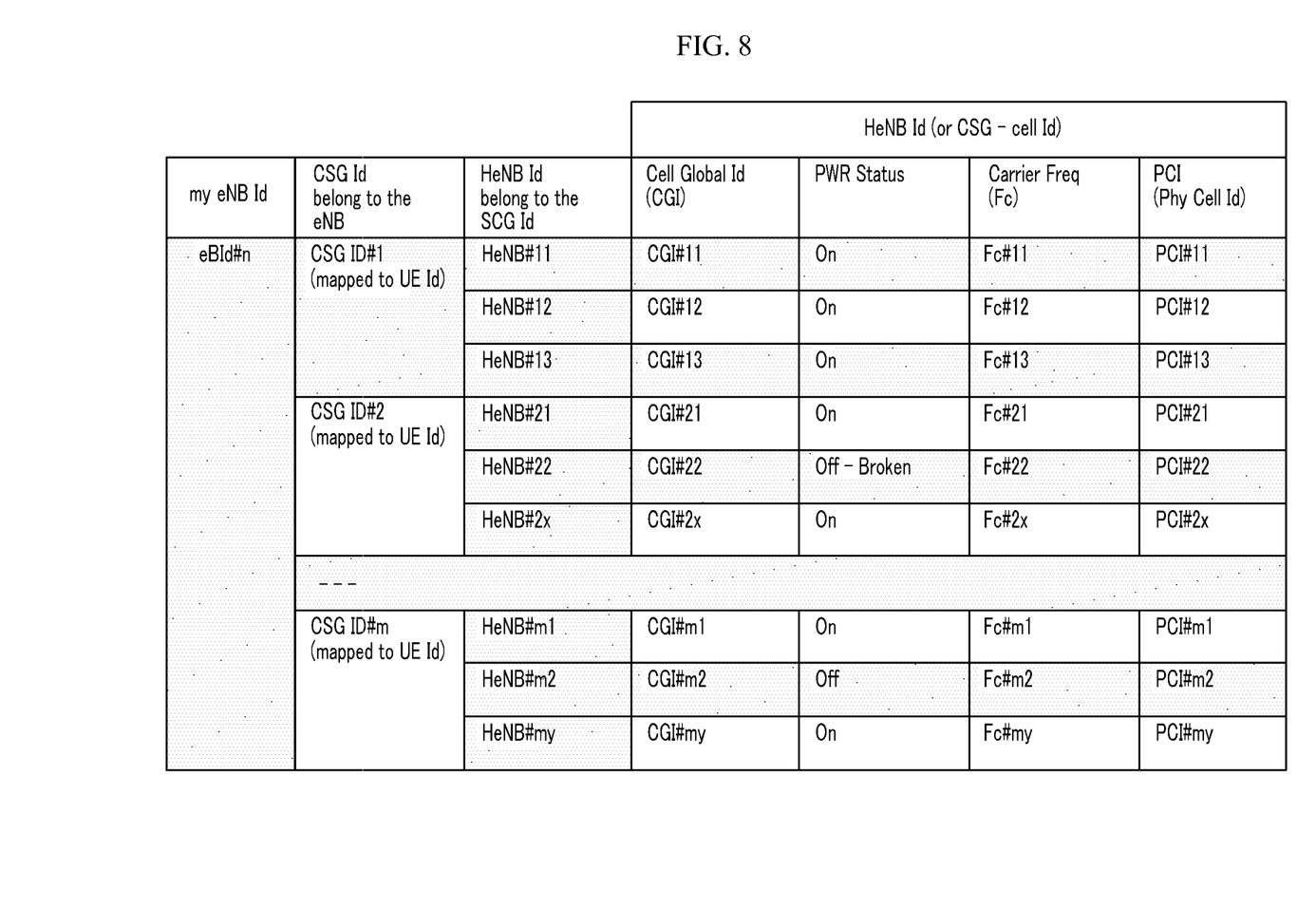
FIG. 8 is a view illustrating information of a home cell according to an exemplary embodiment of the present invention.
Figure 9:
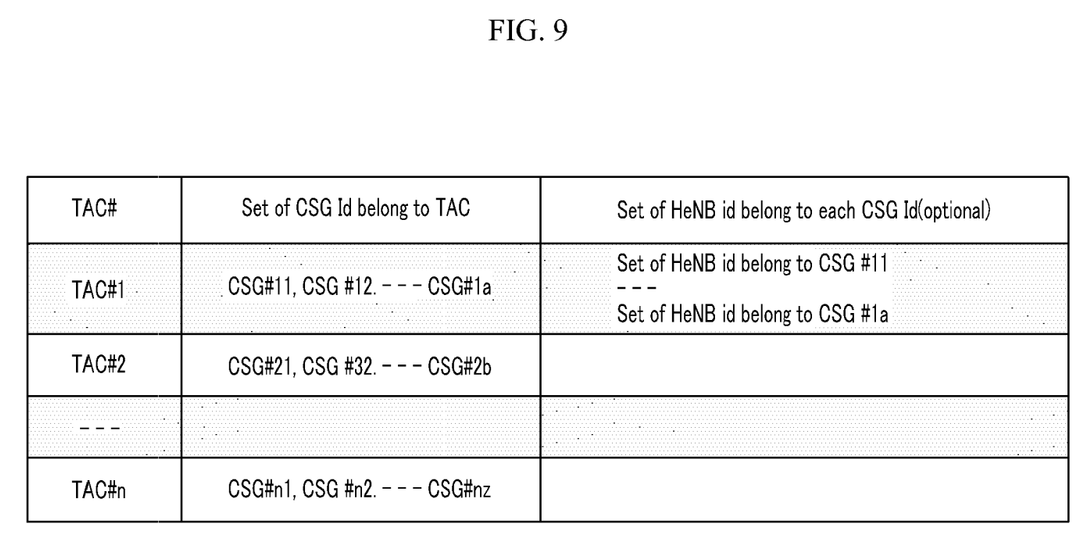
FIG. 9 is another view illustrating information of a home cell according to an exemplary embodiment of the present invention.

FIG. 8 is a view illustrating information of the home cell 20 according to an exemplary embodiment of the present invention, and FIG. 9 is another view illustrating information of the home cell 20 according to an exemplary embodiment of the present invention.

In a wireless communication system according to an exemplary embodiment of the present invention, cell types may be roughly classified into big cells, medium cells, small cells, and very small cells, and two or more different cell types may overlap with each other in a specific area. At this time, a large cell can build up a cell-configuration of the IDs of small cells topologically surrounding it and various status information required for cell search and manage the database in real time, and the terminal can receive this information, thereby reducing cell search load when searching for neighboring cells.

In the present invention, the macro cell 10 can manage the home cell 20, and further an evolved packet core (EPC) can manage the home cell 20.

Accordingly, the ID and status information of the home cell 20 according to an exemplary embodiment of the present invention may be as shown in FIG. 8. Moreover, the information of the home cell 20 belonging to a paging area ID (PAC) may include a set of HeNB IDs belonging to each CSG ID as shown in FIG. 9. The information as shown in FIG. 9 can be managed by an operation and management server.

Figure 10:
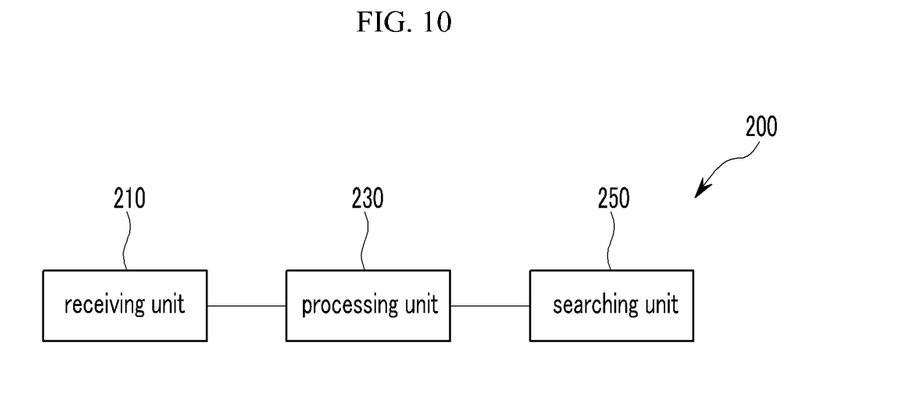
FIG. 10 is a block diagram schematically illustrating a terminal according to an exemplary embodiment of the present invention.

FIG. 10 is a block diagram schematically illustrating a terminal according to an exemplary embodiment of the present invention.

Referring to FIG. 10, the terminal 200 includes a receiving unit 210, a processing unit 230, and a searching unit 250.

The receiving unit 210 receives at least one of a paging message, a system information message, and a layer 3 message from the macro cell base station 110.

The processing unit 230 updates a cell ID based on information included in the received message, updates the cell status, and determines a cell search cycle. The cell search cycle can be determined according to the duration in which the terminal resided in a particular cell, the residence time, and the number of visits.

The searching unit 250 searches for an accessible home cell based on the information updated by the processing unit 230.

In this manner, according to the present invention, cell search can be efficiently carried out by controlling the cell search of the terminal 200 depending on a communication environment, thereby reducing the power consumption of the terminal 200.

According to the embodiments of the present invention, cell search can be efficiently carried out by controlling the cell search of the terminal depending on a communication environment, thereby reducing the power consumption of the terminal.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for a mobile device terminal to control cell search, the method comprising:
   receiving a message including first cell search information from a macro cell base station that manages a macro cell;
   updating second cell search information stored in the terminal based on the first cell search information;
   searching for an accessible cell based on the updated second cell search information,
   wherein the receiving of the message comprises receiving a paging message,
   wherein the receiving of the paging message comprises:
   detecting and receiving a physical downlink control channel signal while the terminal maintains an idle state;
   determining whether the physical downlink control channel signal corresponds to the terminal by comparing a cell ID in the physical downlink channel signal with a home cell ID of the terminal; and
   when the physical downlink control channel corresponds to the terminal, demodulating a physical downlink shared channel.

2. The method of claim 1, wherein the cell comprises a home cell smaller in size than the macro cell.

3. The method of claim 1, wherein the receiving of the message comprises receiving a system information message.

4. The method of claim 1, wherein the receiving of the message comprises receiving a layer 3 message.

5. The method of claim 1, wherein the updating comprises determining a cell search cycle.

6. The method of claim 5, wherein the determination of the cell search cycle determines the cell search cycle based on at least one of a duration when the terminal resided in the cell, information on a residence time when the terminal resided in the cell, and a number of times when the terminal visits the cell.

7. The method of claim 1, wherein the updating comprises updating a cell ID.

8. The method of claim 7, wherein the updating of a cell ID comprises:
   if a first cell ID included in a first cell search list is included in a second cell search list, activating the first cell ID; and
   if a second cell ID included in the first cell search list is not included in the second search list, deactivating the second cell ID.

9. The method of claim 1, wherein the updating comprises updating a cell status.

10. The method of claim 8, wherein the updating of a cell status comprises, if the cell status is a failed state, informing the user of the failed state.

11. The method of claim 1, wherein the updating comprises, if the carrier frequency of the cell has been changed, updating information on the changed frequency.

12. The method of claim 1, further comprising accessing the searched cell.

13. A mobile device terminal comprising:
   a receiving unit for receiving a message including first cell search information from a macro cell base station that manages a macro cell;

a processing unit for updating second cell search information that the terminal stores based on the first cell search information; and a searching unit for searching for an accessible cell based on the updated second cell search information, wherein the processing unit updates a cell ID, wherein the processing unit activates a first cell ID when the first cell ID included in a first cell search list is included in a second cell search list and deactivates a second cell ID when the second cell ID included in the first cell search list is not included in the second search list.

14. The terminal of claim 13, wherein the message comprises at least one of a paging message, a system information message, and a layer 3 message.

15. The terminal of claim 14, wherein the paging message comprises a physical downlink control channel (PDCCH) signal.

16. The terminal of claim 13, wherein the processing unit updates a cell status.

17. The terminal of claim 13, wherein the processing unit determines a cell search cycle, wherein the cell search cycle is determined based on at least one of a duration when the terminal resided in the cell, information on a residence time when the terminal resided in the cell, and a number of times when the terminal visits the cell.

* * * * *